United States Patent [19]
Smith et al.

[11] Patent Number: 5,777,305
[45] Date of Patent: Jul. 7, 1998

[54] PACKAGE ASSEMBLY AND METHOD FOR ACTIVATING PREPAID DEBIT CARDS

[75] Inventors: M. Brooks Smith, Atlanta; David M. Wilkie, Marietta, both of Ga.

[73] Assignee: Incomm, Atlanta, Ga.

[21] Appl. No.: 590,999

[22] Filed: Jan. 24, 1996

[51] Int. Cl.⁶ .......................... G06K 5/00; H04M 15/00
[52] U.S. Cl. .......................... 235/380; 235/381; 379/114
[58] Field of Search .................... 235/380, 493, 235/492, 462, 454, 381; 375/121, 144; 380/825.31, 825.34; 379/114

[56] References Cited

U.S. PATENT DOCUMENTS

| | | | |
|---|---|---|---|
| 5,281,799 | 1/1994 | McIntire et al. | 235/380 |
| 5,410,136 | 4/1995 | McIntire et al. | 235/380 |
| 5,427,832 | 6/1995 | Longtin | 428/40 |
| 5,506,395 | 4/1996 | Eppley | 235/486 |
| 5,511,114 | 4/1996 | Stimson et al. | 379/114 |
| 5,577,109 | 11/1996 | Stimson et al. | 235/381 X |

Primary Examiner—Donald T. Hajec
Assistant Examiner—Thien Minh Le
Attorney, Agent, or Firm—Thomas, Kayden, Horstemeyer & Risley, LLP

[57] ABSTRACT

A package assembly and method for permitting the activation and deactivation of prepaid debit cards, such as prepaid telephone calling cards, at a point of sale. The package assembly has a prepaid debit card with a particular identification number and is contained within a cavity formed between a backing material and a sheath. A machine readable marking is disposed on the package assembly and is detectable by machine reading apparatus currently used in the industry. The machine readable marking is encoded with information identifying the package assembly as a prepaid debit card and with the identification number of the prepaid debit card. When the machine readable marking is scanned by a machine reading apparatus at the point of sale, the identification number of the prepaid debit card, along with an activation or deactivation request, is communicated to a host computer. The host computer retrieves the prestored information pertaining to that identification number, processes the information, and either activates or deactivates the card based upon the information received from the point of sale. The host computer then communicates the action it has taken to the point of sale. If the host computer activated the prepaid debit card, the prepaid debit card can immediately be removed from the package assembly and used to conduct transactions. If the host computer deactivated the prepaid debit card, the prepaid debit card can be restocked at the point of sale for later purchase and activation.

23 Claims, 3 Drawing Sheets

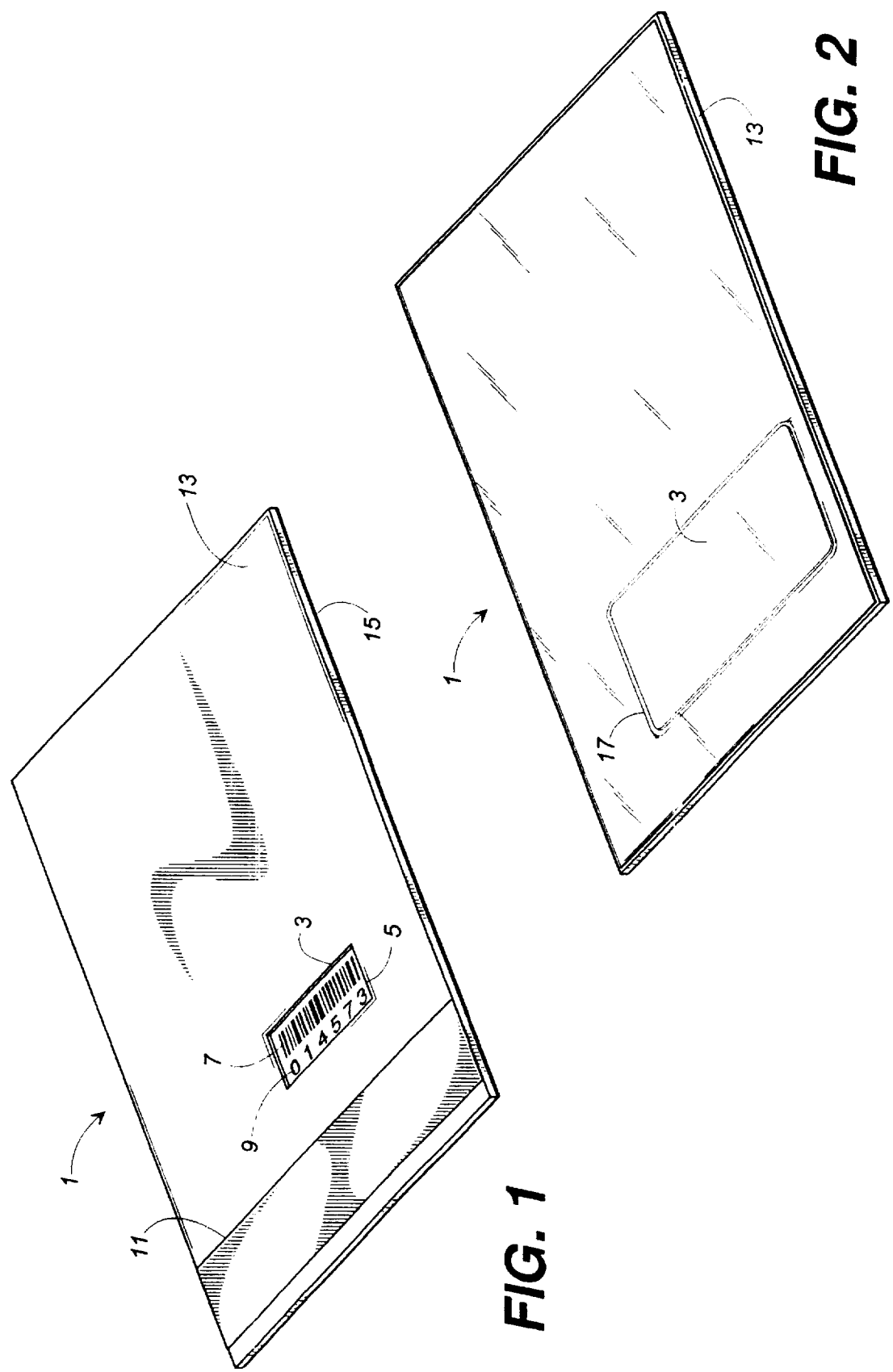

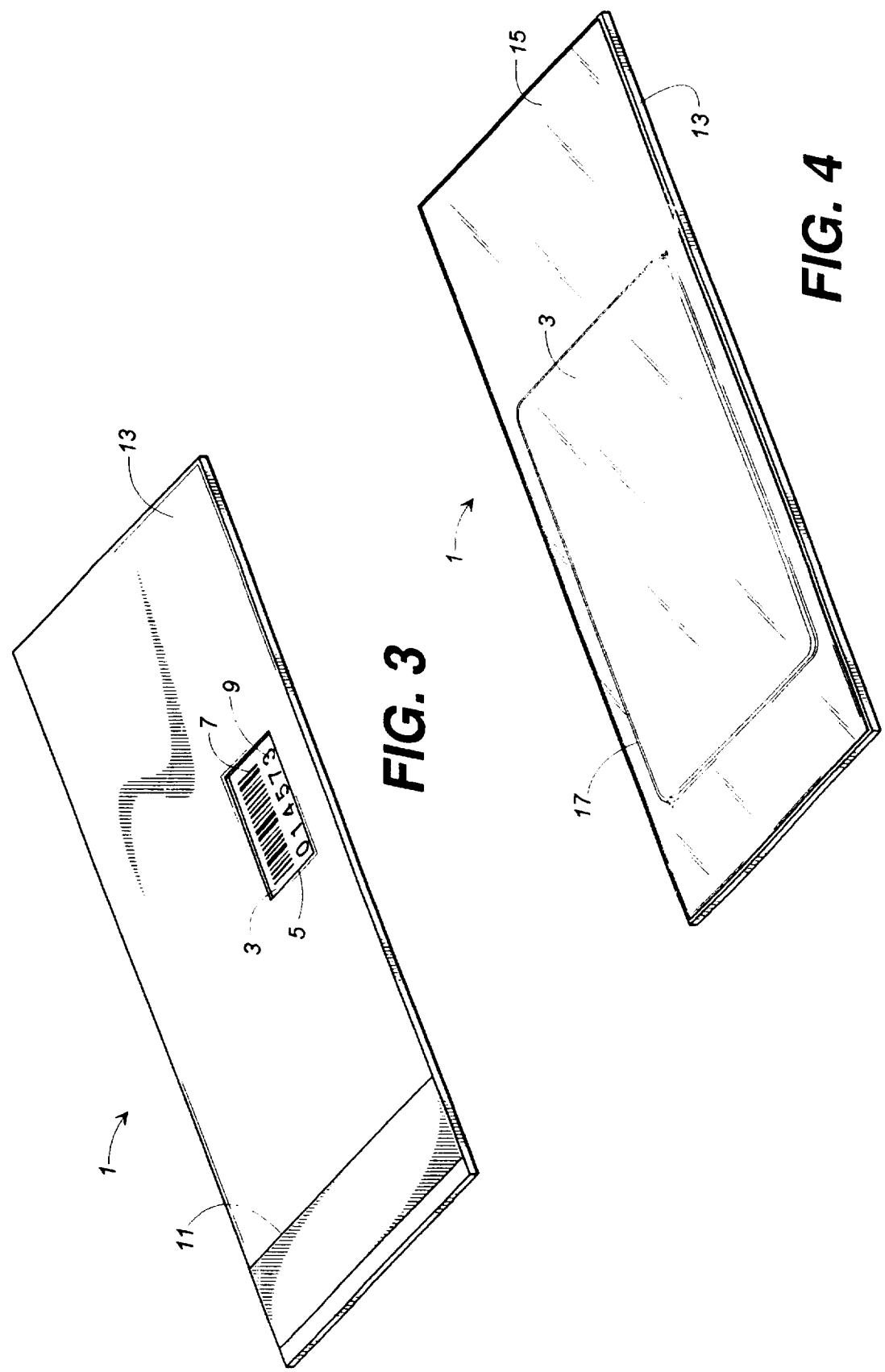

PACKAGE ASSEMBLY AND METHOD FOR ACTIVATING PREPAID DEBIT CARDS

The present invention generally relates to prepaid debit cards, such as but not limited to prepaid phone cards, and more particularly, to a package assembly and methodology for permitting activation of prepaid debit cards at a point of sale from a remote location.

BACKGROUND OF THE INVENTION

The use of debit cards has become an integral part of our society. In the context of this document, debit cards include any form of automatic teller machine (ATM) cards, credit cards, telephone calling cards, prepaid telephone calling cards, and the like. Presently, these cards are used in a variety of ways. Many cards have a magnetic strip on their surface containing information relating to that card and/or the cardholder. Generally, magnetic strip readers are used to decode the information contained on a card's magnetic strip and communicate that information to a central station for processing. In the case of credit cards, if the information received at the central station indicates that the credit card is valid and that the account is in good standing, an authorization message is communicated back to the magnetic strip reader at the point of sale and the transaction can be completed. Verification that the card holder is the person authorized to use the card, however, is not possible electronically.

Electronic cardholder verification became possible through the use of personal identification numbers. Magnetic strip readers are still used to decode information stored on the magnetic strip of the card, but the additional step of entering a personal identification number (PIN) is also required in order to complete a transaction. The PIN number, which in theory is known only by authorized card users, is thus one of the more well known means of electronically verifying that the card holder is a valid user. An example of a commonly used debit card employing this technology is an ATM card.

As our society has become more mobile and travel more frequent, telephone calling cards have become a common commodity. The magnetic strips on these cards are also capable of being decoded by magnetic strip readers connected to telephones. In the event a magnetic strip reader is not available, all of the information necessary to manually dial the telephone is printed on the card. In either event, once a call is placed using the telephone calling card, the charges for the call are billed to the card holders account. Due to telephone rates which vary based upon such factors as the time of day of the call, the location of the person making the telephone card call, the location of the recipient of the call, and the distance of the call, it is impracticable for the user of a telephone caing card to maintain an adequate record of telephone calling card expenses until the monthly telephone bill and statement are received.

The prepaid phone card allows a calling card user to maintain an accurate record of expenses. Generally, prepaid phone cards are sold at, for example, department stores, grocery stores, convenience stores, and other places of business. Traditionally, many companies often distribute prepaid phone cards to their customers, free of charge, as part of a promotional offer.

Typically, retail prepaid phone cards are produced with a specific dollar figure, for example, $50.00, $25.00, or $10.00, printed on the card. Also printed on the card is an access telephone number and a card identification number. The access telephone number is that number initially dialed to interface with a host computer. The card identification number is the number dialed to identify the specific account stored in the host computer database pertaining to the prepaid phone card being used. The card is then packaged for display at various retail outlets for purchase. Additionally, the card identification number and corresponding dollar figure associated with that card is stored in the database of a host computer. When a customer purchases the prepaid phone card, the dollar value is included in the purchase price. The customer need only remove the card from the package, and telephone calls totalling the dollar figure printed on the card can be made. The card holder merely dials the access number, generally a 1-800 number, manually enters the prepaid phone card identification number printed on the card, and dials the telephone number of the location to be called. The access number links the card holder to the host computer. Once the prepaid phone card identification number is received by the host computer, the information stored in the database pertaining to that specific card is retrieved. Charges incurred by placing the call are then deducted by the host computer. This process is repeated each time a call is made using that prepaid phone card until the dollar value printed on that card is reached. At that time any phone call in progress will be disconnected, and the prepaid phone card will no longer be valid. Generally, the card user will be given a warning prior to the expiration of the card. Additionally, some prepaid phone cards are rechargeable and allow cardholders who wish to continue using the prepaid phone card to add time to the card prior to its expiration by charging a new dollar value to, for instance, a credit card.

The predominant shortcoming of prepaid phone cards is that they are active prior to packaging. This has a significant cash flow impact on, and has caused significant problems for merchants selling the prepaid phone cards. Because the cards are active before sale, theft of the prepaid phone cards has become a problem. Once one or more of the packages of prepaid phone cards are stolen, the cards can be removed from the package and are immediately ready for use. Unless the merchant can determine the card identification number of the stolen prepaid calling cards and report it to the host computer, the full value to the card can be used for conducting telephone transactions.

Because of the small size of the prepaid phone cards and their packaging, the prepaid phone cards are easily concealable and frequently taken. To combat this, merchants have resorted to taking prepaid phone cards off the shelves, and instead have placed them in safes, concealed them behind the counter, and/or otherwise placed them under lock and key. Thus, a need exists in the industry for a technique that reduces the instances of theft of prepaid phone cards, reduces the amount of merchants' cash tied up in inventory, and to provide for better overall inventory control of these cards.

SUMMARY OF THE INVENTION

Accordingly, an object of the present invention is to overcome the deficiencies and inadequacies of the prior art as described above.

Another object is to provide a package assembly and method for activation of a prepaid debit card at a point of sale.

Another object of the present invention is to provide a package assembly and method for permitting deactivation of a prepaid debit card at a point of sale.

Another object of the present invention is to provide a package assembly and method for permitting activation and/or deactivation of a prepaid debit card at a point of sale from a remote location.

Another object of the present invention is to provide a package assembly and method for permitting activation and deactivation of a prepaid debit card using equipment presently available at the point of sale.

Another object of the present invention is to provide a package assembly and method which reduces monetary loses resulting from the theft of prepaid phone cards.

Another object of the present invention is to reduce the amount of money merchants must invest in inventory.

In general, the invention involves scanning a machine readable marking that is disposed on a package assembly in order to activate or deactivate the card that is situated therein. Broadly stated, the present invention provides a novel package assembly and method for permitting activation and deactivation of a prepaid debit card at the point of sale. The machine readable marking can be, but is not limited to a magnetic strip, a bar code, UPC, or any other marking capable of being encoded with information that identifies the card.

In a first embodiment of the novel package assembly and method, the package assembly has a backing material for supporting a prepaid debit card, and a sheath covering at least one side of the backing material and the debit card. The backing material has a magnetic strip disposed thereon and an aperture therethrough. When packaged, the debit card is positioned within the cavity such that an identification number printed on the debit card is detectable through the aperture, and the card number of the debit card is concealed. The identification number on the prepaid debit card can be encoded in bar code, UPC, and/or alphanumeric form, and corresponds to information stored in a host computer. The identification number is for use at the point of sale and is processed by the host computer in order to determine whether the debit card should be activated or deactivated. The debit card number, on the other hand, is used to identify the card once the debit card has been activated and unpackaged. The card number is generally entered by the purchaser of the card in order to conduct transactions with the prepaid debit card. The card number is concealed within the package assembly so that no one will have access to the card number until the prepaid debit card is purchased. This prevents a non-purchaser from appropriating the card number in order to conduct unauthorized transactions with that card once it is subsequently activated through purchase.

Once the debit card is placed in the cavity during the packaging process, the debit card identification number is decoded by a standard bar code reader, the information is recoded in magnetic form, and a standard magnetic strip read/write mechanism transfers the identification number to the magnetic strip of the package assembly. Although the prepaid debit card may have a dollar value printed thereon, the card is inactive while awaiting purchase in the package assembly.

In order to use the prepaid debit card, the package assembly is first registered as a sale at the point of sale. The magnetic strip of the package assembly is then passed through a magnetic strip reader at the point of sale in order to decode the identification number. The magnetic strip reader, having previously been programmed to recognize the identification number encoded on the magnetic strip as the identification number that corresponds to a particular prepaid debit card, communicates the decoded prepaid debit card identification number to the host computer. An activation request is also communicated to the host computer. The host computer then retrieves the stored data corresponding to the particular identification number of that debit card, processes the information received from the point of sale, and activates the debit card. The debit card, now activated, can immediately be removed from the package assembly and be used to conduct transactions.

If the purchaser of a prepaid debit card returns a previously purchased and unopened package assembly (one containing an activated card) for a refund, the same steps can be followed to deactivate the debit card. The package assembly is first registered as a return at the point of sale, the magnetic strip of the package assembly is then passed through a magnetic strip reader, the identification number of the debit card and a deactivation request is then communicated to the host computer, the host computer retrieves the stored data corresponding to the particular identification number of that debit card, the information is processed by the host computer, and the debit card is deactivated. Since the debit card is inactive, the package assembly containing the debit card can then be reshelved for future sale at the point of sale.

In a second embodiment of the novel package assembly and method, the package assembly is formed in the size and shape of paper currency, more particularly, a dollar bill, for easy and convenient storage in any of the paper currency trays of a conventional cash register. The method of activating and deactivating the debit card of the package assembly of this embodiment is the same as the method of the first embodiment described above.

In a third embodiment of the novel package assembly and method, the backing material has an aperture, but no magnetic strip. The debit card is packaged within the cavity such that the identification number printed on the debit card is detectable through the aperture and such that the card number of the debit card is concealed. The identification number appears in bar code and/or alphanumeric form and corresponds to information stored in a host computer for that number. In this embodiment, the bar code can be a special UPC type font. Thus, when the bar code is scanned by a standard bar code reader at a point of sale, the package assembly is registered as a sale, the card is identified as a prepaid debit card, and the identification number and activation request are communicated to the host computer. The host computer then retrieves the stored data corresponding to the particular identification number of that debit card, processes the data received from the point of sale, and activates the debit card. The third embodiment thus eliminates the need for two steps at the point of sale. Because the bar code can be a special UPC type font, the bar code reader at the point of sale can both ring the sale, and communicate the activation data to the host computer. The second step of passing the package assembly through a magnetic strip reader to communicate with the host computer is eliminated. Similarly, deactivation of the debit card in the manner described above for the first embodiment is applicable here as well. The difference being that the magnetic strip reader is not required for this embodiment.

In any of the above mentioned embodiments of the present invention, if the magnetic strip is defective, or if the magnetic strip reader or bar code reader is inoperative, the alphanumeric identification number printed on the card and detectable through the aperture can be manually input at the point of sale and communicated to the host computer.

An advantage of the present invention is that prepaid debit cards can be packaged in a manner that will allow the debit cards to be displayed at the point of sale so that customers will have ease of access to the cards.

Another advantage of the present invention is that prepaid debit cards can be packaged in an inactive mode, thus reducing the risk of loss due to theft.

Another advantage of the present invention is that prepaid debit cards can be distributed to points of sale on a consignment basis. In this way, the retail merchant need only pay the costs associated with packaging the prepaid debit cards prior to the actual sale of the prepaid debit cards. The debit card company is paid by the merchant once a purchaser pays for the card at the point of sale.

Additional objects, features, and advantages of the present invention will become apparent to one with skill in the art by examining the following drawings and detailed description. All such additional objects, features, and advantages are intended to be included herein within the scope of the present invention.

BRIEF DESCRIPTION OF THE DRAWINGS

The present invention, as defined in the claims, can be better understood with reference to following drawings. The drawings are not necessarily to scale, emphasis instead being placed upon clearly illustrating the principles of the present invention.

FIG. 1 illustrates a rear perspective view of a first embodiment of the package assembly in accordance with the present invention;

FIG. 2 illustrates a front perspective view of a first embodiment of FIG. 1;

FIG. 3 illustrates a rear perspective view of a second embodiment of the package assembly of the invention sized for storage in the paper currency trays of a cash register;

FIG. 4 illustrates a front perspective view of the second embodiment of FIG. 3;

DETAILED DESCRIPTION OF THE PREFERRED EMBODIMENT

Figure 6:
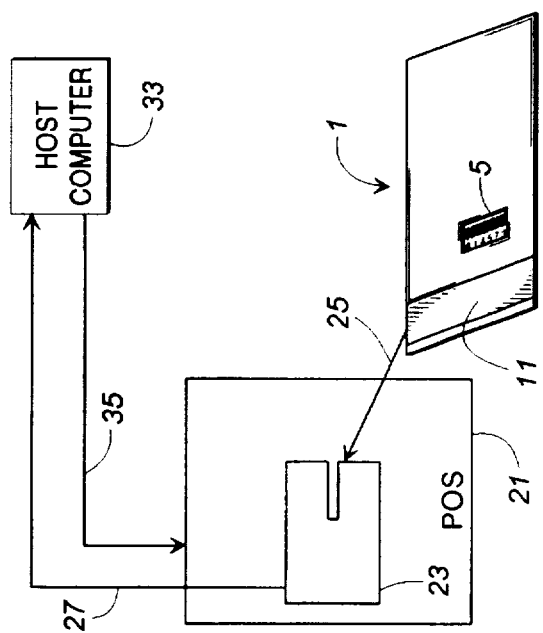
FIG. 6 illustrates a schematic view of an alternative communication path between the first embodiment of FIGS. 1, 2, and the host computer.

With reference to the figures wherein like reference numerals designate corresponding parts throughout the several views, a novel package assembly 1 shown in FIG. 1 comprises a backing material 13 having an aperture 5 therethrough, a prepaid debit card 3 having an identification number 9 and a corresponding bar code 7 printed thereon, a magnetic strip 11, and a sheath 15 affixed to the backing material 13 to thereby define a cavity 17 as shown in FIG. 2. The prepaid debit card 3 is removably bonded to the front surface of the backing material 13 with glue or some other comparable adhesive substance, and/or by the sheath 15. The prepaid debit card 3 is positioned against the backing material 13 such that the bar code 7 and identification number 9 are viewable through the aperture 5 in the backing material 13. To ensure that the bar code 7 and identification number 9 remain viewable, this sheath 15 is adhered to the front surface of the backing material 13 by heat, an adhesive composition, or other conventional means so that the sheath defines a cavity over and around the prepaid debit card 3 as shown in FIG. 2. In this configuration, the sheath is capable of completely supporting the prepaid debit card 3.

In composition, the backing material 13 is preferably a paper product, such as paperboard stock, but could be any material capable of passage through a conventional magnetic strip reader. The sheath 15 is preferably a thin plastic film, for instance, a transparent acetate material. However, the sheath 15 need not be transparent to practice the present invention and could be produced from a variety of alternative materials. The prepaid debit card 3 is preferably a plastic product similar in size and shape to a credit card, ATM card, or a prepaid phone card, but may be formed from paper or any other substance.

The magnetic strip 11 is preferably positioned on the back surface of the backing material 13, but could easily be positioned on the front surface. The magnetic strip 11 must be positioned inward of the peripheral edge of the backing material 13 a sufficient distance so that the magnetic strip can be read when the package assembly is passed through a standard magnetic strip reader. In the preferred embodiment, the combined thickness of the backing material 13 and the sheath 15 is less than or equal to 30 mils. While the entire surface area of package assembly 1 does not have to meet this criteria, it is critical that the portion of the package assembly 1 that will be passed through the magnetic strip reader does, as conventional magnetic strip readers can read magnetic strips positioned on surfaces less than or equal to 30 mils in thickness.

A second embodiment of the package assembly 1 is shown in FIGS. 3 and 4. In this embodiment, the package assembly 1 is generally rectangular and is similar in size and shape to paper currency used in the United States. It is designed to be received and stored in the paper currency trays of cash registers commonly used in the retail market. In this embodiment, generally the magnetic strip 11 can only be positioned along one of the two short sides of the rectangular structure due to the size and positioning of the prepaid debit card 3 as shown in FIG. 4. Because the debit card 3 extends above the backing material 13, the package assembly is uneven along the portions of the two long sides that would be passed through the magnetic strip reader. If a magnetic strip was placed on either of these sides, it could not be read due to this uneven surface.

Each prepaid debit card 3 has an unique bar code 7 and identification number 9 printed thereon. The identification number 9 corresponds to the bar code 7, and is present for situations that require manual entry of the prepaid debit card 3 identification number. During the packaging process, the package assembly 1 is passed through a standard bar code reader that decodes the bar code 7 to determine the card's identification number. This information is then processed and passed through a standard magnetic strip read/write mechanism that encodes the card's identification number onto the magnetic strip 11.

Although the prepaid debit card has a dollar amount (e.g., $10, $20, etc.) printed on its face, the debit card has no value until it is purchased by a customer at the point of sale. For this reason, the package assembly 1 can be sold to the retail merchant for the cost of the packaging. In this case, the debit card company is paid by the merchant once the prepaid debit card is activated at the point of sale. Further, because the prepaid debit card is inactive when distributed to the point of sale, the retail merchant is able to freely display the package assembly 1 in table top displays, on shelves, and otherwise within the plain view and grasp of the customers. The customer, and end user, of the prepaid debit card merely chooses the package assembly containing the prepaid debit card having the desired dollar value, and takes it to the cash register at the point of sale.

Figure 5:
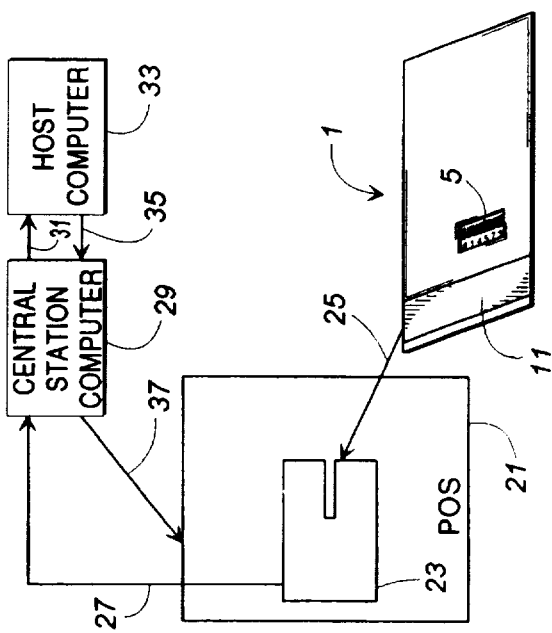
FIG. 5 illustrates a schematic view of the communication path between the first embodiment of FIGS. 1, 2, and the host computer.

The package assembly 1 will generally have a non-merchandise code, UPC, or some other price code to be used to register the sale to the customer. When the point of sale cashier enters this code at the register, a message will inform the cashier that the package assembly 1 should be passed through a magnetic strip reader before the transaction is complete. It should be noted that any number of procedures can be used at the point of sale to inform the cashier that the package assembly needs to be passed through a magnetic strip reader. As shown in FIG. 5, the magnetic strip 11 of package assembly 1 is then passed through a standard magnetic strip reader 23 at the point of sale 21 as shown by broken arrow 25. In the event the magnetic strip is defective or the magnetic strip reader inoperative, the identification number 9 viewed through aperture 5 can be manually entered at the register to achieve the same result.

When the point of sale is one of several points of sale for a large retail concern having a central station computer, the information decoded by the magnetic strip reader 23 is communicated to the central station as shown by arrow 27. The central station computer 29 then processes this data and in turn communicates the identification number of the prepaid debit card together with an activation request to a host computer 33 at a remote location as shown by arrow 31. In the preferred embodiment, this communication is established over an X.25 line, or a dial-up line. The host computer 33 recognizes the received information as an identification number for a prepaid debit card, and immediately searches its database for the corresponding file associated with that identification number. Once located, information for the prepaid debit card having that identification number such as the dollar value of the prepaid debit card, whether the card is active or inactive, and the dollar value of the prepaid debit card remaining will generally be available to the host computer. It should be noted that this list is not inclusive. An unlimited amount of information pertaining to the prepaid debit card's identification number may be stored in the database. The host computer will then process the activation request received from the central station computer 29.

If the information stored in the database indicates that the prepaid debit card is inactive, the host computer 33 will automatically activate the prepaid debit card, update its database with this information, and communicate this information back to the central station computer 29 as shown by arrow 35. The central station computer 29 will then send an activation message back to the point of sale 21 as shown by arrow 37. The now activated prepaid debit card 3 can immediately be removed from the package assembly 1 and used to conduct transactions. From this point forward, the host computer 33 will track transactions charged to this debit card and will deactivate the card when the customer has used the entire dollar value of that card. Similarly, if a customer retrns the package assembly 1 unopened, and desires a refund, the magnetic strip 11 of the package assembly 1 can again be passed through the magnetic strip reader 23 at the point of sale 21. In this instance, the identification number of the prepaid debit card is communicated to the central station computer 29 as shown by arrow 27. The identification number, together with a deactivation request, is then communicated from the central station computer 29 to the host computer 33 as shown by arrow 31. If the prepaid debit card 3 has in fact been previously activated, the host computer 33 will immediately deactivate the prepaid debit card 3, record this information in that card's database file, and communicate a deactivation message back to the central station computer 29 as shown by arrow 35. This information will then be communicated from the central station computer 29 back to the point of sale 21 as shown by arrow 37. The customer can then be issued a refund and the package assembly 1 can be reshelved at the point of sale for future purchase. The total transaction time for the above described methods of activating and deactivating prepaid calling cards using the package assembly 1 of this invention has been as fast as 1.9 seconds in the preferred embodiment.

A situation may arise where an activation or deactivation request is received by the host computer, but the information in the database pertaning to the identification number received by the central station precludes completion of the request. For instance, the identification number of the debit card being read at the point of sale may not have been entered into the host computer database prior to, during or after packaging, thus there is no corresponding database file to retrieve. Additionally, the debit card of a package assembly may have been activated at the point of sale when purchased, returned to the point of sale for a refund, but not deactivated prior to reshelving. In that case, when a subsequent customer purchases that prepaid debit card, and an activation request is communicated to the host computer, the database file at the host computer will indicate that the debit card is already activated. In these and other similar situations, the host computer will communicate a message to the point of sale that the transaction cannot be completed.

In the event a central station computer 29 is unavailable, or a retail chain having multiple points of sale chooses not to use their central station computer 29 to conduct prepaid debit card activation transactions, existing point of sale equipment can still be used to conduct the prepaid debit card activation transactions. As shown in FIG. 6, the magnetic strip 11 of the package assembly 1 is passed through a magnetic strip reader 23 at the point of sale 21 as shown by arrow 25. In this instance, one or more of the point of sale's standard Veriphones® or other similar types of magnetic strip readers can be employed. The strip reader 23, having previously been programmed to process and communicate the information contained on magnetic strip 11, communicates the identification number of the prepaid debit card 3 of package assembly 1 directly to the host computer 33 as shown by arrow 27. Additionally, the magnetic strip reader 23 sends an activation or deactivation request. As previously discussed above, the host computer searches its database for the corresponding file, completes the request, and communicates the appropriate message to the point of sale 21 as shown by arrow 35. Because the magnetic strip reader 23 communicates with the host computer 33 using a separate link, generally a standard telephone line, the transaction time is increased and is thus less efficient.

Figure 7:
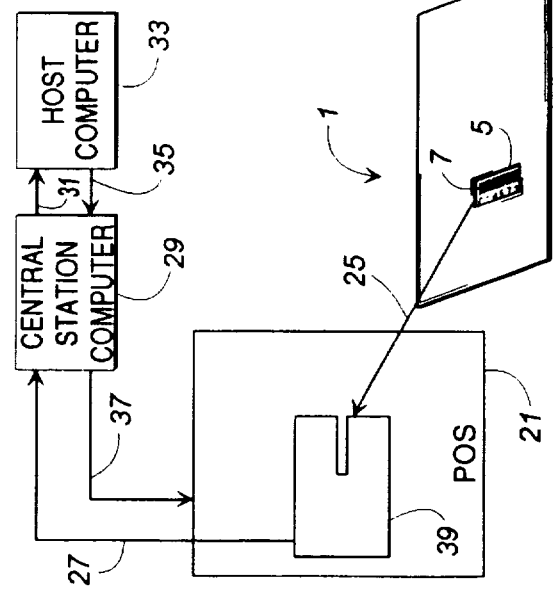
FIG. 7 illustrates a schematic view of the communication path between the third embodiment of the package assembly of the invention and a host computer.

In accordance with the third embodiment of the present invention, the machine readable marking of the novel package assembly 1 is a bar code 7 having a unique UPC type font in lieu of the magnetic strip. As shown in FIG. 7, the bar code 7 having a unique UPC type font is read by a standard UPC bar code reader 39 at the point of sale 21 as shown by arrow 25. Because the bar code 7 is a special UPC type font, the UPC bar code reader 39 at the point of sale 21 performs two functions. With one pass of the bar code 7 of package assembly 1, UPC bar code reader 39 rings the sale, and processes the bar code 7 to determine the identification number of the prepaid debit card 3. This information is then communicated to the central station computer 29 as shown by arrow 27 for processing. Based upon this information, the central station computer 29 communicates the identification number of the prepaid debit card 3 together with an activation or deactivation request to the host computer 33 as shown by arrow 31. As previously discussed, the host computer searches its database, locates the file, processes the request, and communicates the action taken back to the central station computer 29 as shown by arrow 35. This message is then communicated from the central station computer 29 back to the point of sale 21 as shown by line 37. Thus, the second step of passing the package assembly 1 through a magnetic strip reader 23 is eliminated.

It will be obvious to those skilled in the art that many variations may be made to the preferred embodiments described above without departing from the novel teachings of the present invention. All such variations are intended to be incorporated herein and within the scope of the present invention.

Wherefore, the following is claimed:

1. A package assembly for permitting activation and deactivation of a prepaid debit card at a point of sale, said package assembly comprising:

a prepaid debit card with an identification number that identifies a debit account associated with said debit card and a card number that identifies said card exclusively, a package for securing said prepaid debit card:

a machine readable marking on said package for encoding data that identifies said debit account, and whereby said data on said machine readable marking is read to activate and deactivate said debit account at the point of sale prior to removal of said debit card from said package.

2. The package assembly of claim 2, wherein said package further comprises a backing material and a sheath, said sheath and said backing material collectively defining a cavity that holds said card.

3. The package assembly of claim 2, wherein said backing material further comprises an aperture that exposes a region on said card.

4. The package assembly of claim 3, wherein said identification number is viewable through said aperture and said card number is concealed when said prepaid debit card is positioned within said cavity.

5. The package assembly of claim 1, wherein said package is adapted to conceal said card number and to expose said identification number on said prepaid debit card.

6. The package assembly of claim 5, wherein said package further includes a backing material and a sheath, said sheath and said backing material collectively defining a cavity that holds said prepaid debit card.

7. The package assembly of claim 6, wherein said identification number is exposed through an aperture in said backing material.

8. A package assembly for permitting activation of a prepaid debit card at a point of sale, said package assembly comprising:

a prepaid debit card having an identification number and a card number associated therewith;

a backing material having an aperture therethrough; and a sheath for attachment to said backing material, said sheath and said backing material collectively defining a cavity sized to receive said prepaid debit card such that said identification number is detectable through said aperture and said card number is concealed.

9. The package assembly of claim 8, wherein said backing material comprises paperboard.

10. The package assembly of claim 8, wherein said sheath comprises a clear plastic film.

11. The package assembly of claim 8, wherein said prepaid debit card comprises a plastic material.

12. The package assembly of claim 8, further comprising at least one machine readable marling for encoding data that identifies said debit card.

13. The package assembly of claim 12, wherein said machine readable marking comprises a bar code, and whereby decoding said bar code permits activation and deactivation of said prepaid debit card.

14. The package assembly of claim 12, wherein said machine readable marking comprises a magnetic strip affixed to said backing material.

15. The package assembly of claim 14, wherein said identification number can be decoded from said debit card and encoded onto said magnetic strip, and whereby decoding said magnetic strip penrits activation and deactivation of said debit card.

16. A method for packaging a prepaid debit card for activation at a point of sale, the method comprising the steps of:

forming an aperture in a backing material;

providing a prepaid debit card having an identification number and a card number associated therewith;

positioning said prepaid debit card on said backing material such that said identification number is exposed through said aperture and said card number is concealed; and affixing a sheath to said backing material over said debit card to thereby form a cavity.

17. The method of claim 16, further comprising the step of removably bonding said debit card within said cavity to said bacling material.

18. The method of claim 16, further comprising the step of affixing a machine readable marling to said debit card.

19. The method of claim 16, further comprising the step of affixing a machine readable marking to said bacldng material.

20. The method of claim 19, further comprising the step of decoding said identification number on said debit card.

21. The method of claim 20, further comprising the step of encoding said identification number onto said machine readable marking.

22. A method for permitting activation and deactivation of a prepaid debit card at a point of sale, comprising the steps of:

affixing an identification number that identifies a debit account on a prepaid debit card;

affixing a card number to said prepaid debit card that identifies said prepaid debit card exclusively;

securing said prepaid debit card in a package;

identifying said debit account on said package with a machine readable marking on said package; and entering the debit account identification information on said package at the point of sale into a system configured to activate or deactivate said debit account prior to removal of said debit card from said package.

23. The method of claim 22, further comprising the steps of:

concealing said card number from view with said packaging, and adapting said packaging to expose said identification number to view.

* * * * *